United States Patent Office 3,000,976
Patented Sept. 19, 1961

3,000,976
MANUFACTURE OF FLUORINATED AROMATIC COMPOUNDS
Colin Russell Patrick, Maurice Stacey, and John Colin Tatlow, all of Birmingham, England, assignors to National Research Development Corporation, London, England, a British corporation
No Drawing. Filed Oct. 30, 1959, Ser. No. 849,712
Claims priority, application Great Britain Nov. 5, 1958
8 Claims. (Cl. 260—650)

This invention relates to the manufacture of highly fluorinated aromatic compounds, that is highly fluorinated carbocyclic compounds containing a benzene nucleus such as fluorobenzenes, fluoronaphthalenes, fluorodiphenyls and so on.

Highly fluorinated alicyclic compounds are readily produced by the fluorination of aromatic compounds, for example by reaction with cobaltic trifluoride at temperatures of 150°–200° C. These highly fluorinated alicyclic compounds are relatively stable and resistant to defluorination reactions, but we have discovered that, under certain reaction conditions, monocyclic substances such as highly fluorinated cyclohexenes, and cyclohexanes, and polycyclics such as fluorodicyclohexyls and flurodecalins may be defluorinated to aromatic compounds such as fluorobenzenes, fluorodiphenyls and fluornaphthalenes respectively. This affords an alternative route for the preparation of hexafluoro- and pentafluorobenzenes, and offers the only route or the most practicable route at present for the preparation of perfluoroalkyl benzenes, perfluoronaphthalenes, perfluorodiphenyls, and other fluorinated aromatic compounds which hitherto have not been prepared or which can be prepared only by difficult methods.

The process according to the invention consists broadly in vaporising the material to be defluorinated and contacting the vapour with a heated reactive metal which is capable of forming a stable and preferably nonvolatile fluoride.

The process may be carried into effect in a static system or more conveniently by passing the vapour of the material to be defluorinated in a continuous stream borne by an inert carrier gas over heated pieces of gauze, wire, turnings or powder of metals such as nickel, iron cobalt or copper, whose fluorides are stable and involatile. The meal surface must be clean and uncontaminated and, as after some use the activity of the metal diminishes as metal fluoride is formed, the metal surface must be restored to activity by reducing the fluoride, for example, with hydrogen.

Temperatures from about 350°–600° C. have been found most suitable for the process. High temperatures in excess of 600° C. favour complete decomposition of the fluorinated material. Other reactions, such as dehydrofluorination of a hydrogen-containing compound, may compete with the defluorination process, but dehydrofluorination reactions are generally favoured by temperatures in the lower part of the specified range.

The presence of hydrogen atoms or of alkyl groups in the cyclic alkane or alkene makes the defluorination process go more readily in the sense that the lower temperatures are sufficient to bring about reaction, and that higher yields of material are very often obtained. The temperature of the reaction within the region from about 350°–600° C. which gives the optimum yield of the desired fluoraromatic compound in a given apparatus does however depend very much on the individual compound which is being defluorinated.

The yield of a defluorinated product also depends upon the contact time of the vapour with the heated reactive metal. The contact time giving an optimum yield in a particular apparatus will depend upon the compound being defluorinated but in general contact times between about 15 and 45 minutes are required; a reduced yield being obtained if the reaction is too short and decomposition without further increase in yield resulting if the contact time is too long.

Normally the reactions conditions (temperature and contact time) will be chosen to favour a defluorination reaction and give an optimum yield of a defluorinated product. There are circumstances, however, in which the reaction conditions may be chosen to give the maximum yield of a given product principally by a defluorination reaction but also by a dehydrofluorination reaction of a minor constituent of a starting material. For example, the fluorination of benzene usually produces perfluorocyclohexane with some undecafluorocyclohexane. A good yield of hexafluorobenzene may be obtained from this product under conditions which favour the defluorination of the perfluorocyclohexane and the dehydrofluorination of the undecafluorocyclohexane; so that the purification of the perfluorocyclohexane is not required.

This process for converting fluorinated carbocyclic compounds having one or more cyclohexane or cyclohexene rings to fluorinated aromatic compounds is specifically applicable to the following processes.

Firstly, highly fluorinated cyclohexanes and cyclohexenes and their alkyl (such as methyl and ethyl) derivatives can be defluorinated to the corresponding highly fluorinated benzenes and alkylated members of the benzene series. Secondly, highly fluorinated polycyclic compounds such as dicyclohexyl, dicyclohexyl methane and tricyclohexyl methane, their alkyl derivatives and their equivalent hexene mono-unsaturated compounds can be defluorinated to the corresponding highly fluorinated diphenyls, diphenylmethanes, triphenylmethanes and their derivatives. Thirdly, the highly fluorinated polycyclic compounds having condensed six-membered rings such as decalins including the alkyl (such as methyl or ethyl) derivatives of decalin can be defluorinated to highly fluorinated polynuclear aromatic compounds such as the naphthalenes.

Various examples of defluorination processes in accordance with the invention will now be described. They are typical examples of processes in accordance with the three processes specified above. Several examples are given for the conversions of saturated cyclohexane based compounds and the conversions of the corresponding unsaturated cyclohexene based compounds are carried out under similar conditions with some minor changes to obtain optimum conditions. The corresponding unsaturated compounds are in fact produced to some extent during the defluorination of the saturated compounds.

The following examples are of small scale experiments but it has been found that they can be scaled up without difficulty.

The examples were carried out using a long nickel tube of 2 inch diameter, packed with small pieces of iron gauze. The tube was contained in a furnace and was heated over most of its length. Over the central portion, about 2 feet in length, the temperature was a maximum and was sensibly constant to within about 10° C. during any experiment. The temperature of this region was recorded as that of the reaction. The substances to be defluorinated were fed into the reactor by distillation into a stream of nitrogen. The nitrogen flow rate was maintained constant during experiments, and was measured using a calibrated Rotameter flowmeter. After each reaction the metal fluoride formed by the defluorination process was reduced to the metal by passage of hydrogen at temperaures between 300° C. and 700° C., enabling further defluorination reactions to be carried out.

The products were collected in a trap immersed in liquid air, and were analysed and separated by a gas chromatographic method. The resolved products were identified using infra-red and ultraviolet spectroscopy and, where possible, by use of elemental analysis and mass spectrometric estimates of molecular weights.

*Example 1*

Undecafluorocyclohexane (5 g.) was passed through the reactor at 530° C. in a stream of nitrogen flowing at 2 litres/hour. The product (1 g.) contained hexafluorobenzene (50%) and a smaller amount of pentafluorobenzene (33%).

*Example 2*

Perfluoromethylcyclohexane (8 g.) was distilled through the reactor at 450° C. in a stream of nitrogen flowing at 2 litres/hour. The product (3.7 g.) was separated to give perfluorotoluene (1.4 g.).

*Example 3*

Decafluorocyclohexene (14 g.) was passed through the reactor at 600° C. in a stream of nitrogen flowing at 4 litres/hour. The product (6.7 g.) was separated to give hexafluorobenzene (2.9 g.).

*Example 4*

4H-nonafluorocyclohexene (23 g.) was passed through the reactor at 500° C. in a stream of nitrogen flowing at 4 litres/hour. The product (18.2 g.) was shown to contain hexafluorobenzene (25%) and pentafluorobenzene (20%).

*Example 5*

4H/5H-octafluorocyclohexene (8 g.) was passed through the reactor heated to 510° C. in a stream of nitrogen flowing at 2 litres/hour. The products (1.7 g.) were separated gas chromatographically to give 1,2,3,4-tetrafluorobenzene (1.3 g.) together with some penta- and hexafluorobenzene.

*Example 6*

Perfluoro-1,3-dimethylcyclohexane (18 g.) was passed through the reactor heated to 460° C. in a stream of nitrogen flowing at 2 litres/hour. The products (14.5 g.) were separated by preparative scale chromatography to give perfluoro-m-xylene (3.3 g.) and unreacted starting material (9.5 g.).

*Example 7*

Perfluoro-1,4-dimethylcyclohexane (8 g.) was passed through the reactor at 510° C. in a stream of nitrogen flowing at 2 litres/hour. The mixture of products (5.7 g.) was separated by gas chromatography to give decafluoro-p-xylene (2.0 g.).

*Example 8*

Perfluoro-1,2-dimethylcyclohexane (18 g.) was passed through the reactor heated to 470° C. in a stream of nitrogen flowing at 2 litres/hour. The product (12.35 g.) was separated by preparative scale chromatography to give perfluoro-o-xylene (2.4 g.).

*Example 9*

Perfluoro-1,3,5-trimethylcyclohexane (18 g.) was passed through the reactor heated to 470° C. in a stream of nitrogen flowing at 4 litres/hour. The product (4.7 g.) was separated to give perfluoromesitylene (2.8 g.).

*Example 10*

Perfluoroethylcyclohexane $C_8F_{16}$ (9.1 g.) was passed through the reactor at 490° C. in a stream of nitrogen flowing at 6 litres/hour and gave a product (4.9 g.) which was separated by large scale gas chromatography to give a 23% yield of decafluoroethylbenzene (1.5 g.).

*Example 11*

Perfluorocyclohexane (21 g.) was passed through the reactor at 590° C. in a stream of nitrogen flowing at 4 litres/hour. The product (9.5 g.) consisted partly of hexafluorobenzene (2.2 g.).

*Example 12*

Perfluorodicyclohexyl $C_{12}F_{20}$ (5.2 g.) was passed through the reactor at 390° C. in a stream of nitrogen flowing at 2 litres/hour. 0.8 g. of a product was obtained and was purified by crystallisation from benzene to give 0.5 g. of decafluorodiphenyl.

*Example 13*

Perfluorodecalin (9.0 g.) was passed through the reactor at 450° C. in a stream of nitrogen flowing at 4 litres/hour, and gave a product containing a solid. This solid after filtration and recrystallisation from light petroleum or benzene gave octafluoronaphthalene (3.0 g.) M.P. 86–87° C.

We claim:
1. A process for the manufacture of a highly fluorinated aromatic compound from a vaporised highly fluorinated alicyclic compound containing at least one ring which is a member of the group consisting of hexane and hexene rings and wherein a said alicyclic compound is reacted at a temperature of between about 350° and 600° C. with a metal reactive with fluorine to produce a stable fluoride.

2. A process according to claim 1 and in which the alicyclic compound is fully fluorinated.

3. A process according to claim 1 and in which a highly fluorinated monocyclic compound is reacted to produce a highly fluorinated member of the benzene series.

4. A process according to claim 1 and in which a highly fluorinated polycyclic compound is reacted to produce a highly fluorinated polynuclear aromatic compound.

5. A process according to claim 4 and in which a highly fluorinated decalin is reacted to produce a highly fluorinated naphthalene.

6. A process according to claim 4 and in which a highly fluorinated dicyclohexyl is reacted to produce a highly fluorinated diphenyl.

7. A process for the manufacture of a highly fluorinated aromatic compound wherein a highly fluorinated carbocyclic compound containing at least one ring which is a member of the group consisting of hexane and hexene rings is passed over a metal reactive with fluorine to produce a stable fluoride heated to a temperature between 350° C. and 600° C. to produce the highly fluorinated aromatic compound.

8. A process according to claim 7 and in which the reactive metal is a member of the group consisting of iron, nickel, cobalt and copper.

References Cited in the file of this patent

UNITED STATES PATENTS 2,488,216     McBee et al.     Nov. 15, 1949

OTHER REFERENCES

Godsell et al.: Nature, 178, 199–200 (1956).